United States Patent [19]

Crockatt et al.

[11] Patent Number: 4,576,987

[45] Date of Patent: Mar. 18, 1986

[54] AQUEOUS WATER-REPELLENT COATINGS

[75] Inventors: William B. Crockatt, Mississauga; John Rimma, Scarborough, both of Canada

[73] Assignee: DeSoto, Inc., Des Plaines, Ill.

[21] Appl. No.: 681,207

[22] Filed: Dec. 13, 1984

[51] Int. Cl.$^4$ .......................... C08K 5/01; C08L 91/08
[52] U.S. Cl. .................................... 524/487; 524/277; 524/488; 524/489; 524/501; 524/507; 525/123
[58] Field of Search ............... 524/488, 487, 507, 501, 524/489, 277; 525/123

[56] References Cited

U.S. PATENT DOCUMENTS

| | | | |
|---|---|---|---|
| 3,862,074 | 1/1975 | Hickey | 524/507 |
| 4,450,247 | 5/1984 | Crockatt et al. | 523/518 |

*Primary Examiner*—Theodore E. Pertilla
*Attorney, Agent, or Firm*—Dressler, Goldsmith, Shore, Sutker & Milnamow, Ltd.

[57] ABSTRACT

An aqueous coating composition is disclosed which contains a large proportion of wax which dries to provide a continuous and durable film from which the wax exudes slowly and progressively to the surface over a long period of time to provide long term water resistance. This composition comprises: (1) from 5% to 40% of an aqueous microcrystalline wax dispersion; (2) from 40% to 93% of an aqueous emulsion of copolymerized monoethylenically unsaturated monomers having a sufficiently low glass transition temperature to coalesce on air drying; and (3) from 1% to 20% of an N-methylol functional self crosslinking polyurethane aqueous dispersion in which the polyurethane contains sufficient volatile amine-neutralized carboxyl groups for water dispersibility, these proportions being by weight based on the solids content of the three components which are blended together.

20 Claims, No Drawings

AQUEOUS WATER-REPELLENT COATINGS

DESCRIPTION

1. Technical Field

This invention relates to water-repellent coatings which contain a large proportion of wax and which are water-based, thus entirely or largely eliminating the organic solvents which were previously required to form coatings possessing long term water repellency and durability on exterior exposure. These coatings are primarily intended for application to exterior wood surfaces where they must cure under ambient conditions.

2. Background Art

The provision of coating compositions which can be applied to wood to provide coatings which dry under ambient conditions to possess long term water repellency and durability on exterior exposure has long perplexed the art. We have previously found organic solvent solution coating compositions which contain a large proportion of paraffin wax and which provide the characteristics described previously (see U.S. Pat. No. 4,450,247 issued May 22, 1984), but organic solvents introduce pollution and hazard, and it is desired to minimize these difficulties using coatings which contain very little volatile organic solvent. This invention thus provides aqueous coatings which largely duplicate the results previously obtained with the solvent-based coatings of our prior patent.

DISCLOSURE OF INVENTION

In accordance with this invention, an aqueous coating composition is provided which contains a large proportion of wax which dries to provide a continuous and durable film from which the wax will slowly and progressively exude to the surface to provide a water repellent surface which confers long term water resistance. This coating composition comprises (1) from 5% to 40%, preferably from 10% to 20%, of an aqueous microcrystalline wax dispersion; (2) from 40% to 93%, preferably from 45% to 65%, of an aqueous emulsion of copolymerized monoethylenically unsaturated monomers having a sufficiently low glass transition temperature to coalesce on air drying; and (3) from 1% to 20%, preferbly from 3% to 12%, of an N-methylol functional self crosslinking polyurethane aqueous dispersion in which the polyurethane contains sufficient volatile amine-neutralized carboxyl groups for water dispersibility.

While three aqueous components are combined, proportions are by weight based on the solids content of the three components which are blended since water and other components are secondary. The compositions will usually also include some pigmentation, preferably constituted by finely divided silica in admixture with a platy clay. Thickeners will also be present to provide desired coating rheology.

The specified combination of components enables a large proportion of wax solids to be stably incorporated into an aqueous medium which cures on air drying to provide a continuous and durable film from which the wax will slowly and progressively exude to the surface over a long period of time to provide the desired long term water resistance. The self-crosslinking polyurethane also contributes blush resistance (blushing is the tendency to whiten on exposure to moisture) when the coatings are not extensively pigmented.

Microcrystalline wax dispersions are well known and are aqueous dispersions containing wax dispersed in water by means of a surfactant, which is preferably anionic, to provide a dispersion of fine particle size. It is convenient in this invention to use paraffin waxes having a melting point in the range of 50° C.–70° C., preferably 55° C. to 65° C., since this matches the waxes needed for solvent solution application. Wax selection is less critical in this invention than in the solvent-based coatings, so higher melting point waxes and carnauba wax can be used. It is also preferred that the wax be blended with polyethylene wax. In our prior patent, the wax had to be stably incorporated in a solvent solution medium, but in this invention, the wax is incompatible with the water in which it is dispersed, and the dispersion is maintained by a surfactant.

The usual surfactants are anionic, such as sodium lauryl sulfate and sodium lauryl sulfonate, but the surfactants used in microcrystalline wax dispersions are well known and form no part of this invention.

The aqueous emulsion of copolymerized monoethylenically unsaturated monomers having a sufficiently low glass transition temperature to coalesce on air drying is subject to wide variation because so many copolymers are known which are broadly applicable. Acrylic copolymers, which are defined to consist of monoethylenically unsaturated monomers at least 50% of which are acrylate or methacrylate esters with a $C_1$ to $C_8$ alcohol, are particularly contemplated since these hold up well on exterior exposure. Thermoplastic copolymers which include less than 3% of reactive monomers to aid copolymerization and enhance adhesion to the substrate are fully useful herein, but copolymers which contain more than 3% of reactive monomers up to about 40%, usually from 10% to 30%, are also useful.

The term "reactive monomers" denotes a monoethylenically unsaturated monomer which incudes a group other than the ethylenic group which is reactive under the conditions of cure (room temperature in this instance) with the reactive group present in the self crosslinking polyurethane. These groups are illustrated by the carboxyl group (which may be supplied by acrylic or methacrylic acid), the hydroxyl group (which may be supplied by hydroxyethyl acrylate or methacrylate) and the N-methylol group (which may be supplied by N-methylol acrylamide or N-methylol methacrylamide or an ether thereof with a volatile alchohol, such as propanol).

The self crosslinking polyurethane which is used herein is a stable aqueous dispersion of a room temperature curing polyurethane which is an N-methylol terminated polyurethane containing sufficient neutralized carboxyl groups to enable water dispersion. These are provided starting with an isocyanate-terminated polyurethane prepolymer carrying pendant water-dispersing carboxylic salt groups. This prepolymer is end capped with an organic dihydrazide, such as adipic dihydrazide, to provide hydrazide terminal groups which are then reacted with formaldehyde to convert hydrazide end caps into N-methylol groups. Prior to end capping, the polyurethane prepolymer is preferably chain extended with an aliphatic polyamine, and the starting prepolymer desirably includes a small proportion of a polyamine, such as melamine.

The resulting N-methylol terminated polyurethane contains sufficient neutralized carboxyl groups to enable water dispersion, desirably about 0.5% to about 10% by weight of carboxylic acid groups, about 40% to about 100% of which are neutralized to form salt groups with a volatile amine (preferably a tertiary amine such as triethyl amine). The isocyanate-terminated prepolymer is preferably the reaction product of an organic compound containing two isocyanate-reactive hydrogen atoms, such as a dihydric polyester or polyether, a polyfunctional amine, such as melamine, and a dihydroxyalkanoic acid, such as 2,2-dimethylol propionic acid, with a stoichiometric excess of organic diisocyanate, such as toluene diisocyanate or isophorone diisocyanate. The final polyurethane desirably contains about 1% to about 5% by weight of units derived from melamine.

The self crosslinking polyurethane which is used herein is preferably of the type described in Kabi et al. U.S. Pat. No. 4,335,029 issued June 15, 1982 which is a stable aqueous dispersion of a room temperature curing polyurethane prepared by: a. dispersing in water an isocyanate-terminated polyurethane prepolymer containing units derived from melamine in the polymer chain and pendant water-dispersing carboxylic salt groups; b. chain extending the dispersed prepolymer with an aliphatic polyamine chain extender more reactive with isocyanate than water; c. end capping the resulting dispersed polyurethane with an organic dihydrazide; and d. reacting the resulting dispersed end capped polyurethane by mixing formaldehyde into the dipsersion to convert hydrazide end caps into N-methylol groups. The resulting N-methylol terminated polyurethane contains about 1% to about 5% by weight of units derived from melamine, and about 0.5% to about 10% by weight of carboxylic acid groups, about 40% to about 100% of which are neutralized to form salt groups with a volatile amine which is preferably a tertiary amine. The isocyanate-terminated prepolymer is preferably the reaction product of an organic compound containing two isocyanate-reactive hydrogen atoms, melamine, and a dihydroxyalkanoic acid, with a stoichiometric excess of organic diisocyanate. The prepolymer reaction is carried out in organic solvent which is preferably N-methyl pyrrolidone. This solvent remains in the final aqueous dispersion which typically contains about 13% N-methyl pyrrolidone.

Referring more particularly to some of the components which are used in the N-methylol functional self crosslinking polyurethane, the isocyanate-terminated polyurethane prepolymer is formed from polyether polyols which include polyalkylene ether glycols, such as polyethylene glycols, polypropylene glycols, polyoxyethylated polypropylene glycols, polyoxyethylated or polyoxypropylated higher diols, like hexane diol, bisphenols and the like. The polyester polyols are generally prepared by the polyesterification of organic diols with organic dicarboxylic acids, a polyester of adipic acid with a stoichiometric excess of a mixture of hexanediol and neopentyl glycol having an averge molecular weight of from 1,000 to 2,000 being illustrative of a preferred polyol.

While melamine is desirably included with the polyol for reaction with excess diisocyanate, it can be replaced with other polyamines, like benzoguanamine or butylene diamine.

The isocyanate-terminated prepolymer is then reacted with a carboxyl-providing reactant which may be used as a free acid or as an amine salt. Alpha, alpha dimethylol alkanoic acids will preferably provide the carboxyl-providing reactant, and these are further illustrated by 2,2-dimethylol butyric acid, pentanoic acid, octanoic acid or decanoic acid.

The chain extenders are preferably diamines such as ethylene diamine, diethylene triamine, propylene diamine, butylene diamine, hexamethylene diamine, tolylene diamine, and the like.

The dihydrazides are further illustrated by succinic acid dihydrazide.

All of these components and their manner of use is more fully discussed in U.S. Pat. No. 4,335,029, the disclosure of which is incorporated by reference.

It is also desired to include in the coating composition various solids, such as a platy clay and/or a finely divided silica. These help to hold the dispersed particles of resin and wax in stable suspension. Thickeners, such as hydroxyethyl cellulose, are usually added to adjust the rheology. Preservatives are also desirably present as well as defoamers to minimize foaming as the various materials are blended together. These variations will be apparent to those skilled in the art, but are not essential aspects of this invention.

The invention is illustrated in the following example of presently preferred operation.

EXAMPLE

| Component | Pounds | Gallons |
| --- | --- | --- |
| water | 120 | 12 |
| hydroxyethyl cellulose | 1.5 | 0.11 |
| propyl mercuric acetate preservative | 2 | 0.15 |
| tetrapotassium pyrophosphate | 1 | 0.04 |
| defoamer | 3 | 0.33 |
| platy clay (note 1) | 10 | 0.42 |
| finely divided silica (note 2) | 70 | 2.64 |

The above components are dispersed in a Hockmeyer blender and then the following are added:

| Component | Pounds | Gallons |
| --- | --- | --- |
| acrylic copolymer emulsion at 46% solids (note 3) | 320 | 29.91 |
| water | 50 | 5.00 |
| polyurethane dispersion at 30% solids (note 4) | 60 | 5.71 |
| defoamer | 2 | 0.22 |
| microcrystalline wax dispersion at 39% solids (note 5) | 80 | 8.00 |
| water | 220 | 22 |
| premix the following and add | | |
| water | 80 | 8.00 |
| note 6 | 15 | 1.43 |
| note 7 | 10 | 1.05 |
| premix the following and add | | |
| water | 20 | 2.00 |
| hydroxyethyl cellulose | 1 | 0.07 |

(Note 1) Attapulgit clay (Attagel 50 may be used).
(Note 2) Insil A-15 may be used.
(Note 3) An aqueous emulsion copolymer of methyl 35 methacrylate and ethyl acrylate in a weight ratio of 2:1 containing 1% by weight of acrylic acid. The Rohm and Haas product AC-61 may be used.
(Note 4) The N—methylol functional polyurethane aqueous dispersion of Example 1 of U.S. Pat. No. 4,335,029
(Note 5) Michemlube 270 may be used.
(Note 6) A polyurethane associative thickener (Rohm and Haas product QR 708 may be used).
(Note 7) 2,2,4-trimethyl-1,3-pentanediol monoisobutyrate (a coalescing solvent used as a filming aid.

The product produced by blending the materials described above has a viscosity of 80–90 Kreb units, a pigment to binder weight ratio of 0.38, and a pigment volume concentration of 13.9%. Of the total of 27.44% solids, 7.5% is pigment and 19.93% is nonvolatile binder material, including the wax.

This composition can be painted on wood surfaces, such as cedar, to provide a clear coating which dries in air without heating to provide a continuous film which protects the wood. Some exudation of wax occurs shortly after drying as indicated by the beading of water placed on the film, and exudation of wax continues with time to provide long term exterior durability as indicated by weathermeter testing and by exterior exposure. The coating may be further pigmented, if desired, to incorporate desired coloration.

From the standpoint of commercial practice, the concentration of solids in the three named components in the final composition is from about 5% to about 40%. Also, the pigment can be omitted or it can be used in larger amount than in the example, so this invention can be practice using a pigment to binder weight ratio of from 0 to about 1.0.

What is claimed is:

1. An aqueous coating composition containing a large proportion of wax which dries to provide a continuous and durable film from which the wax will slowly and progressively exude to the surface to provide a water repellent surface which confers long term water resistance comprising: (1) from 5% to 40% of an aqueous microcrystalline wax dispersion; (2) from 40% to 93% of an aqueous emulsion of copolymerized monoethylenically unsaturated monomers having a sufficiently low glass transition temperature to coalesce on air drying; and (3) from 1% to 20% of an N-methylol functional self crosslinking polyurethane aqueous dispersion in which the polyurethane contains sufficient volatile amine-neutralized carboxyl groups for water dispersibility, said proportions being by weight based on the solids content of the three components which are blended together.

2. An aqueous coating composition as recited in claim 1 in which said wax component is present in an amount of from 10% to 20% and comprises paraffin waxes having a melting point in the range of 50° C.–70° C.

3. An aqueous coating composition as recited in claim 2 in which the wax is said aqueous microcrystalline wax dispersion includes polyethylene wax and is dispersed with an anionic surfactant.

4. An aqueous coating composition as recited in claim 2 in which said copolymerized monoethylenically unsaturated monomers are present in an amount of from 45% to 65%.

5. An aqueous coating composition as recited in claim 1 in which at least 50% of said copolymerized monoethylenically unsaturated monomers are acrylate or methacrylate esters with a $C_1$ to $C_8$ alcohol.

6. An aqueous coating composition as recited in claim 4 in which said copolymerized monoethylenically unsaturated monomers provide a thermoplastic copolymer which includes less than 3% of reactive monomers.

7. An aqueous coating composition as recited in claim 5 in which said copolymerized monoethylenically unsaturated monomers provide a thermosetting copolymer which includes more than 3% up to about 40% of reactive monomers.

8. An aqueous coating composition as recited in claim 7 in which said reactive monomers carry a reactive group selected from the group consisting of the carboxyl group, the hydroxyl group, and the N-methylol group.

9. An aqueous coating composition as recited in claim 1 in which said N-methylol functional self crosslinking polyurethane aqueous dispersion is present in an amount of from 3% to 12% and is provided by an isocyanate-terminated polyurethane prepolymer carrying pendant water-dispersing carboxylic salt groups which is end capped with an organic dihydrazide to provide hydrazide terminal groups which are reacted with formaldehyde to convert hydrazide end caps into N-methylol groups.

10. An aqueous coating composition as recited in claim 9 in which said isocyanate-terminated polyurethane prepolymer is chain extended with an aliphatic polyamine prior to end capping.

11. An aqueous coating composition as recited in claim 9 in which said prepolymer includes a small proportion of a polyamine.

12. An aqueous coating composition as recited in claim 11 in which said polyamine is melamine.

13. An aqueous coating composition as recited in claim 9 in which said N-methylol terminated polyurethane contains about 0.5% to about 10% by weight of carboxylic acid groups, about 40% to about 100% of which are neutralized to form salt groups with a volatile amine.

14. An aqueous coating composition as recited in claim 13 in which said isocyanate-terminated prepolymer is the reaction product of a dihydric polyester or polyether, melamine, and a dihydroxyalkanoic acid, with a stoichiometric excess of organic diisocyanate.

15. An aqueous coating composition as recited in claim 14 in which said N-methylol functional polyurethane contains about 1% to about 5% by weight of units derived from melamine.

16. an aqueous coating composition as recited in claim 9 in which said N-methylol functional self crosslinking polyurethane aqueous dispersion is prepared by: (a) dispersing in water an isocyanate-terminated polyurethane prepolymer containing units derived from melamine in the polymer chain and pendant water-dispersing carboxylic salt groups; (b) chain extending the dispersed prepolymer with an aliphatic polyamine chain extender more reactive with isocyanate than water; (c) end capping the resulting dispersed polyurethane with an organic dihydrazide; and (d) reacting the resulting dispersed end capped polyurethane by mixing formaldehyde into the dispersion to convert hydrazide end caps into N-methylol groups, the resulting N-methylol terminated polyurethane containing about 1% to about 5% by weight of units derived from melamine, and about 0.5% to about 10% by weight of carboxylic acid groups, about 40% to about 100% of which are neutralized to form salt groups with a volatile amine.

17. An aqueous coating composition as recited in claim 16 in which said isocyanate-terminated prepolymer is the reaction product of an organic compound containing two isocyanate-reactive hydrogen atoms, melamine, and a dihydroxyalkanoic acid, with a stoichiometric excess of organic diisocyanate, said reaction being carried out in an organic solvent which remains in the final aqueous dispersion.

18. An aqueous coating composition as recited in claim 17 in which said organic solvent is N-methyl pyrrolidone.

19. An aqueous coating composition as recited in claim 1 in which the concentration of said three components in the composition is from about 5% to about 40%.

20. An aqueous coating composition as recited in claim 1 having a pigment to binder weight ratio of from 0 to about 1.0.

* * * * *